United States Patent
Dugan et al.

(10) Patent No.: US 8,265,081 B2
(45) Date of Patent: *Sep. 11, 2012

(54) OBTAINING MULTIPLE PORT ADDRESSES BY A FIBRE CHANNEL FROM A NETWORK FABRIC

(75) Inventors: Robert J. Dugan, Hyde Park, NY (US); Giles R. Frazier, Austin, TX (US)

(73) Assignee: Internationanl Business Machines Corporation, Armonk, NY (US)

(*) Notice: Subject to any disclaimer, the term of this patent is extended or adjusted under 35 U.S.C. 154(b) by 214 days.

This patent is subject to a terminal disclaimer.

(21) Appl. No.: 12/362,886

(22) Filed: Jan. 30, 2009

(65) Prior Publication Data

US 2009/0135831 A1 May 28, 2009

Related U.S. Application Data

(63) Continuation of application No. 10/006,948, filed on Dec. 3, 2001, now Pat. No. 7,512,133.

(51) Int. Cl.
    *H04L 12/28* (2006.01)
(52) U.S. Cl. .................. 370/395.3; 392/419
(58) Field of Classification Search ........... 370/395.3, 370/392, 419
    See application file for complete search history.

(56) References Cited

U.S. PATENT DOCUMENTS

| | | |
|---|---|---|
| 5,276,813 A | 1/1994 | Elliott et al. |
| 5,420,988 A | 5/1995 | Elliott |
| 5,684,800 A | 11/1997 | Dobbins et al. |
| 5,734,652 A | 3/1998 | Kwok |
| 5,740,438 A | 4/1998 | Ratcliff et al. |
| 5,884,017 A | 3/1999 | Fee |
| 5,917,805 A | 6/1999 | Manning et al. |
| 6,035,414 A | 3/2000 | Okazawa et al. |
| 6,081,845 A | 6/2000 | Kanemaki et al. |
| 6,084,859 A | 7/2000 | Ratcliff et al. |
| 6,084,876 A | 7/2000 | Kwok et al. |
| 6,131,169 A | 10/2000 | Okazawa et al. |
| 6,138,161 A | 10/2000 | Reynolds et al. |
| 6,148,004 A | 11/2000 | Nelson et al. |
| 6,195,703 B1 | 2/2001 | Blumenau et al. |

(Continued)

FOREIGN PATENT DOCUMENTS

DE 10000123 A1 12/2000

(Continued)

OTHER PUBLICATIONS

IBM Technical Disclosure Bulletin, 'Physical Address Registers for a Fibre Channel Protocol Chip', GM Nordstrom, vol. 37, No. 10, Oct. 1994, pp. 607-608.

(Continued)

*Primary Examiner* — Jason Mattis
(74) *Attorney, Agent, or Firm* — Steven Chiu

(57) ABSTRACT

Apparatus and program product for assigning or confirming multiple address identifications to a single channel adapter. A server contains multiple partitions connected to a single channel adapter which is used to send data and commands to a fabric. A request is sent to the fabric on behalf of each of the partitions, and the fabric assigns or confirms and returns to the adapter, an address identification associated to each partition on whose behalf the request was sent. The assigned or confirmed address is used to communicate between controllers connected to the fabric and the associated partition through the same channel adapter.

15 Claims, 3 Drawing Sheets

U.S. PATENT DOCUMENTS

| | | |
|---|---|---|
| 6,327,621 B1 | 12/2001 | Lee et al. |
| 6,775,553 B1 | 8/2004 | Lioy |
| 6,778,540 B1 | 8/2004 | Ratcliff et al. |
| 6,880,101 B2 | 4/2005 | Golasky et al. |
| 6,889,380 B1 | 5/2005 | Shah |
| 7,512,133 B2 * | 3/2009 | Dugan et al. ............... 370/395.3 |
| 2002/0129127 A1 | 9/2002 | Romero et al. |

FOREIGN PATENT DOCUMENTS

| | | |
|---|---|---|
| EP | 0858199 A2 | 8/1998 |
| WO | WO0017769 A1 | 3/2000 |

OTHER PUBLICATIONS

USPTO U.S. Appl. No. 10/006,948 to Robert J. Dugan et al, filed Dec. 3, 2001, Office Action dated Sep. 7, 2006.
USPTO U.S. Appl. No. 10/006,948 to Robert J. Dugan et al, filed Dec. 3, 2001, Final Office Action dated Mar. 6, 2007.
USPTO U.S. Appl. No. 10/006,948 to Robert J. Dugan et al, filed Dec. 3, 2001, Final Office Action dated May 4, 2007.
USPTO U.S. Appl. No. 10/006,948 to Robert J. Dugan et al, filed Dec. 3, 2001, Office Action dated Dec. 18, 2007.
USPTO U.S. Appl. No. 10/006,948 to Robert J. Dugan et al, filed Dec. 3, 2001, Final Office Action dated Aug. 27, 2008.

* cited by examiner

OBTAINING MULTIPLE PORT ADDRESSES BY A FIBRE CHANNEL FROM A NETWORK FABRIC

CROSS-REFERENCE TO RELATED APPLICATIONS

This application is a continuation of co-pending U.S. patent Ser. No. 10/006,948 filed Dec. 3, 2001 now U.S. Pat. No. 7,512,133 for METHOD AND APPARATUS FOR CONTAINING MULTIPLE PORT ADDRESS BY A FIBRE CHANNEL FROM A NETWORK FABRIC, incorporated herein by reference.

FIELD OF THE INVENTION

The present invention is related to establishing a data path from a channel to an I/O adapter in a data processing system having a network fabric, and is more particularly related to obtaining multiple port addresses by a fibre channel directly from the network fabric.

BACKGROUND OF THE INVENTION

A host Fibre Channel adapter supporting multiple logical partitions (LPARs) or other entities which are executing the Fibre Channel/SCSI (FCP) protocol must have a unique Fibre Channel N_Port address identifier for each LPAR supported. However, there is no existing method by which an adapter with a single Fibre Channel N_Port can obtain multiple N_Port address identifiers directly from the fabric F_Port.

The need to obtain multiple (virtual) N_Port identifiers is a new requirement which arises when multiple host LPARs sharing the same Fibre Channel adapter, execute the SCSI/Fibre Channel protocol (FCP) through a single N_Port. It is advantageous to minimize the number of adapters to reduce cost and to maximize adapter utilization. Others have not solved this problem previously.

There are other protocols which result in an N_Port having more than one ID, such as when an N_Port receives multicast frames (sent to a multicast address) as well as frames sent to its own N_Port address. These other protocols are specifically designed for unique purposes (such as multicast), however, and they require the presence of supporting "servers" in the fabric (e.g. the Multicast Server). They also have limitations which result from the specific function provided. For example, multicast addresses are shared by all N_Ports in the multicast group, but an address used by a logical partition must only be useable by that logical partition.

Another potential method of obtaining another N_Port ID could be achieved by allowing the N_Port to log in multiple times with the fabric, but this would require initialization of flow-control buffers, and would therefore disrupt the operation of preexisting virtual N_Ports with other N_Port Ids.

U.S. Pat. No. 5,276,813 issued Jan. 4, 1994 to Elliott et al. for ACQUIRING ADDRESSES IN AN INPUT/OUTPUT SYSTEM, discloses a computer Input/Output system in which link-level facilities issue an acquire link address frame when initially coming on line. A dynamic switch receiving the frame then assigns a link address to the link-level facility.

U.S. Pat. No. 5,420,988 issued May 30, 1995 to Elliott for ESTABLISHING LOGICAL PATHS THROUGH A SWITCH BETWEEN CHANNEL AND CONTROL UNITS IN A COMPUTER I/O SYSTEM, discloses a mechanism for assigning multiple logical path identifications with a single physical path.

U.S. Pat. No. 6,084,859 issued Jul. 4, 2000 to Ratcliff et al. for INTERNET PROTOCOL ASSISTS USING MULTI-PATH CHANNEL PROTOCOL, discloses an apparatus for allowing any initiating host to establish communications with any receiving host in a computing network using a multi-path channel communication protocol.

SUMMARY OF THE INVENTION

In order to obtain multiple N_Port identifiers, the N_Port first logs in with the fabric by sending a "Fabric Login" (FLOGI) extended link service (ELS) command to the attached F_Port using a source address of all zeros. This step is a normal initialization procedure, as is well known in the art, and is performed by almost all implementations. Upon completion of this step, the N_Port has been assigned its first N_Port address identifier, and service parameters have been transferred. After fabric login is complete, the fabric prepares itself to assign additional N_Port identifiers, and "implicitly" logs in these additional N_Port identifiers. The additional identifiers will be assigned upon the receipt of FDISC as described below.

In order to obtain another N_Port address identifier, the N_Port sends an FDISC ELS command using either a source address identifier of zero or, if known, the new source address identifier using identical service parameters as provided in the original FLOGI. The FDISC ELS is used instead of additional FLOGIs to avoid disruption of the operating environment.

When the N_Port sends the FDISC ELS to the fabric the FDISC provides following functions:
1. It informs the Fabric that a new (virtual) N_Port (and logical partition) exists behind the physical port.
2. It provides the means for the virtual N_Port to transfer a unique Port Name to the fabric.
3. It provides a signal to the fabric to validate and assign the virtual N_Ports new N_Port ID, and allows both the fabric and the virtual N_Port to begin normal frame reception and transmission
4. It provides a signal which causes the fabric to update the name server if necessary or any other database maintained within the fabric.

The use of the FDISC ELS to obtain a new N_Port ID has no effect with ongoing operations of preexisting virtual N_Ports, does not violate existing standards, and does not require the presence of specialized servers within the fabric.

BRIEF DESCRIPTION OF THE DRAWINGS

These and other objects will be apparent to one skilled in the art from the following detailed description of the invention taken in conjunction with the accompanying drawings in which.

DESCRIPTION OF THE PREFERRED EMBODIMENT

Figure 1:
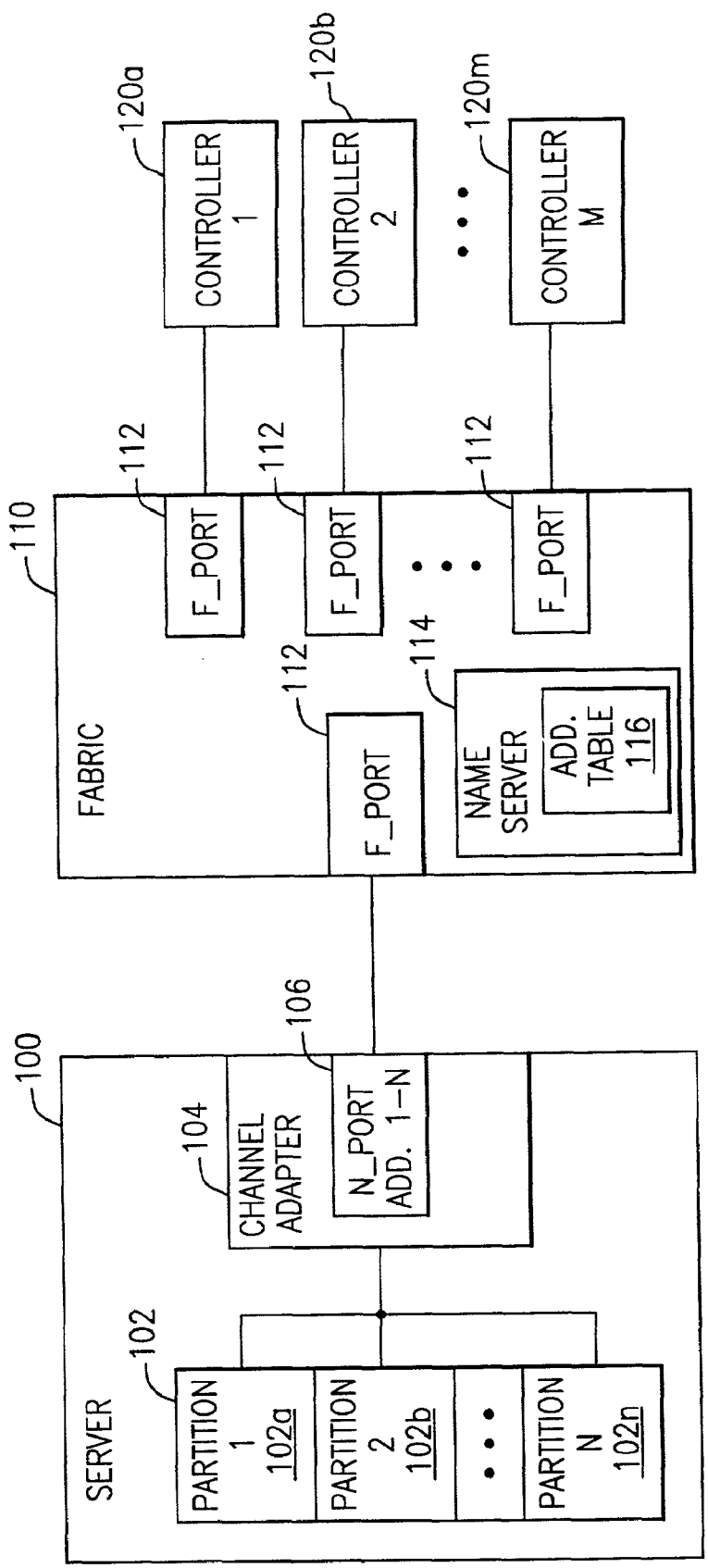
FIG. 1 is a schematic diagram of a data processing network having a server which has at least one N_Port and a network fabric.

FIG. 1 is a schematic diagram of a data processing network usable with the present invention. The data processing network includes a server or host 100 which may be, for instance, an IBM zSeries 900 server. The server 100 includes an operating system which provides for supporting multiple logical partitions (LPARs) 102a-102n. Each LPAR 102 communicates with I/O devices through channel adapters, as is well known. The server 100 is connected to a fabric 110 by a channel adapter 104, with the fabric 110 being connected to one or more controllers 120a-120m controlling I/O devices (not shown) as is well known. The connection and sending of data between the server 100, the fabric 110, and the controllers 120 may, for instance, be as described in proposed standard Fibre Channel Framing and Signaling (FC-FS Rev. 1.40) NCITS Project 1331-D, Oct. 15, 2001.

The adapter 104 is, in the exemplary embodiment, hardware having a software interface for communicating with the LPARs 102, and includes an N_Port 106 for connecting to an F_Port 112 of the fabric 110. Although a single port, the N_Port 106 recognizes multiple addresses, one address for each of the partitions 1-n (LPARs 102a-102n). Once the address for partition 102 is established, communication by, for instance, a controller to that particular partition 102 may be effected by communicating with the partition's assigned address. A name server 114 is provided in the fabric 110 which includes an address table 116. This address table includes, among other things, an identification of each partition 102, and its corresponding N_Port address. Thus, in order to communicate with a partition, the name server 114 may be accessed to determine the N_Port address corresponding to that partition 102, and data is then sent to that N_Port address. It will be understood that each F_Port 112 in the fabric 110 acts to receive and transmit data and commands between the fabric 110 and the channel adapter 104 or the controllers 120a-120m, as is well known.

Figure 2:
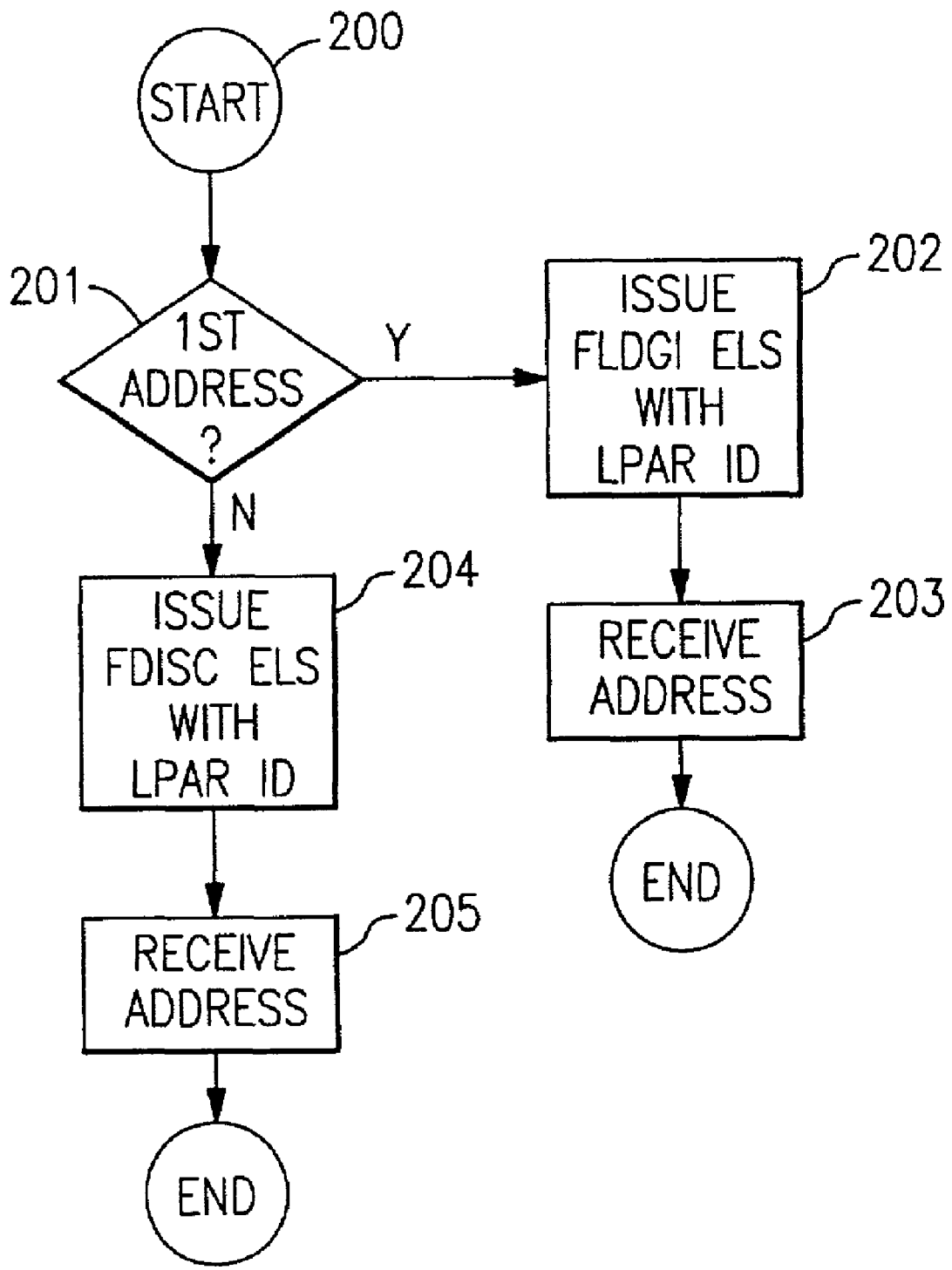
FIG. 2 is a flowchart of the procedure followed by the N_Port of the system of FIG. 1 for requesting an N_Port address form the fabric.

FIG. 2 is a flow diagram of the procedure followed by the N_Port 106 of a fibre channel to obtain an N_Port address from the fabric 110. The procedure starts at 200. If at 201, this is the first address for the N_Port 106, a Fabric Login extended link service (FLOGI ELS) command is issued to the fabric 110. The FLOGI ELS command includes identification for the partition 102 requesting the address, and has a source address of all zeros to indicate to the fabric 110 that an N_Port address identifier is being requested. At 203, the address assigned by the Fabric 110 is received. The FLOGI command is sent in this embodiment on behalf of the first partition 102 requesting an address. This first request may always be assigned by a selected one of the partitions, or may be the first partition needing an address, or may be selected by, for instance, a round robin scheme, as may be desired.

If this is not the first address being selected for a partition 102, at 204, a Fabric Discovery Extended Link Service (FDISC ELS) command is issued using either the source address identifier of zero, or, if known, the new source address identifier using identical service parameters as provided in the original FLOGI command. At 205, the N_Port 106 receives the address assigned or confirmed by the fabric 110 for use with the requesting partition 102.

Figure 3:
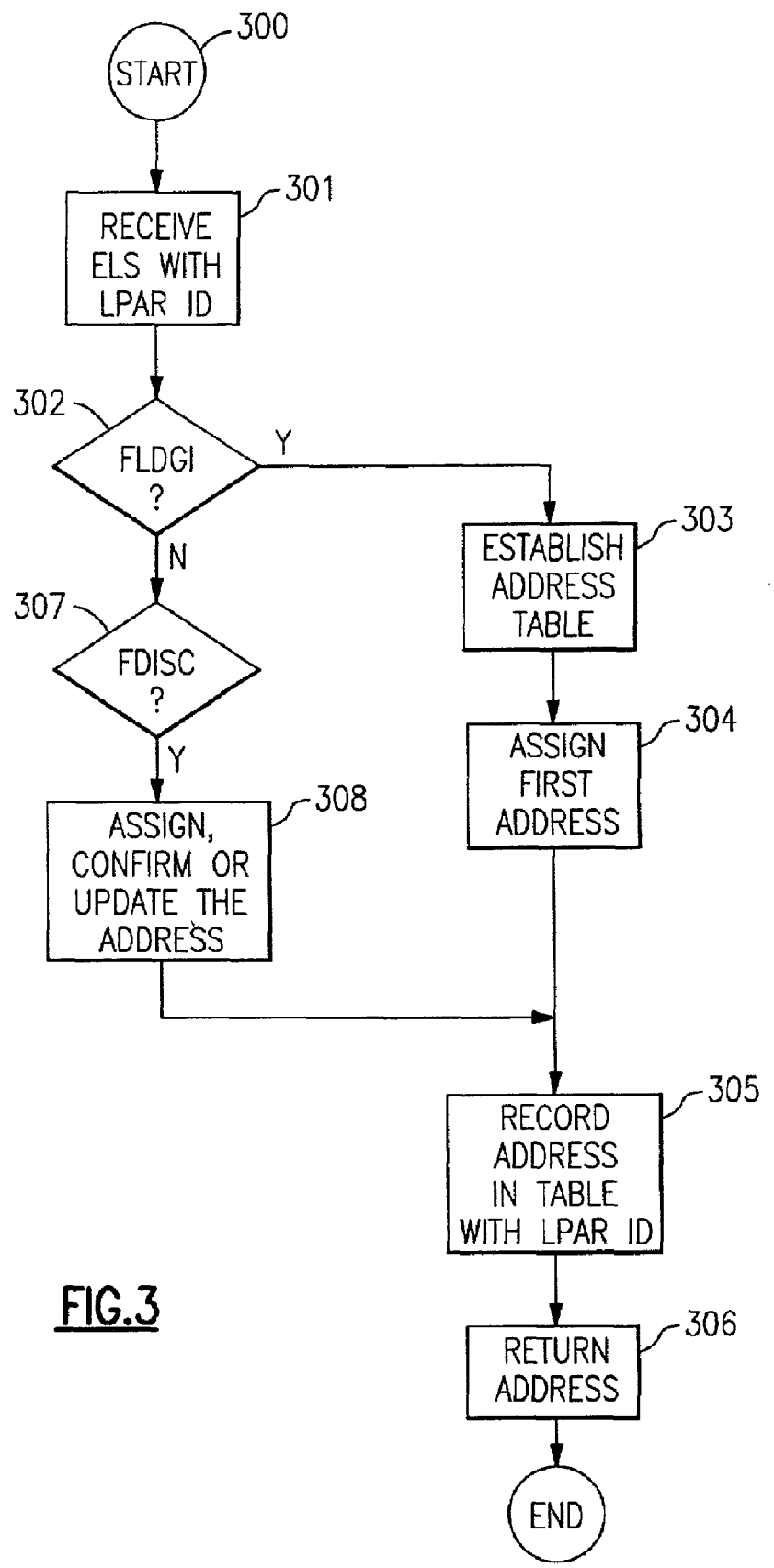
FIG. 3 is a flowchart of the procedure followed by the fabric of FIG. 1 for providing addresses to the N_Port.

FIG. 3 is a flow diagram of the procedure followed by the fabric 110 in assigning the address identifications requested in the flowchart of FIG. 2, and starts at 300. At 301, the fabric 110 receives the ELS command with a partition ID. The partition ID may be the worldwide partition number, or any other identification scheme to identify the partition to be associated with the N_Port address identification. At 302, it is determined if the command is a FLOGI command. If yes, at 303 an address table 116 is established in the name server 114 for the N_Port 106. At 304, the first address identification is assigned for this N_Port 106. At 305, the address identification is recorded in the table 116, along with the partition identification, and other parameters needed for the communications protocol to be used to transfer commands and data between the N_Port 106 and the controllers 120a-m. At 306, the address is returned to the N_Port 106.

If the ELS is an FDISC command at 307, the next address is assigned or confirmed at 308. If a new source address identification is supplied by the FDISC ELS command, that address identification, if acceptable, is used. If an address is not supplied, the next available address is assigned by 110 in accordance with a desired scheme which insures that duplicate numbers are not assigned. In addition at 308, if the partition ID already has an address identification in the table 116, the address identification is updated by the identification in the FDISC ELS command. Thus, the FDISC ELS command may be used to request an address be assigned, may have a proposed address identification confirmed, or may update an old address identification with a new address identification. Then at 305, the partition identification, address identification, and other parameters are recorded in the address table 116, and at 306, the assigned, confirmed, or updated address identification is returned to the N_Port 106. It will now be understood that normal frame reception and transmission can begin. The controllers will see "n" different adapters, one adapter for each partition, but there will be only one channel adapter N_Port 106 with "n" different addresses.

While the preferred embodiment of the invention has been illustrated and described herein, it is to be understood that the invention is not limited to the precise construction herein disclosed, and the right is reserved to all changes and modifications coming within the scope of the invention as defined in the appended claims.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A data processing system comprising:
a server;
multiple partitions in said server;
a fabric;
a channel adapter communicating messages between the partitions and the fabric;
said channel adapter sending multiple requests to the fabric for address identifications each to be assigned to a respective partition identified by a worldwide unique partition identifier, each request sent on behalf of a respective one of said partitions;
said fabric assigning a unique address identification in response to each request, each address identification being associated with the respective partition on whose behalf the request was sent for effecting communication with the respective partition, said assigned address identification being previously unknown to the respective partition;

a table in the fabric storing the worldwide unique partition identifiers and their corresponding addresses; and a transmitter in said fabric returning the assigned address identification for each request, such that when a message is sent from the fabric to a partition via said channel adapter the sender of the message sees multiple channels adapters corresponding to said multiple partitions and wherein multiple addresses are assigned to the same channel adapter as assigned for said multiple partitions.

2. The data processing system of claim 1 wherein said fabric establishes the table in the fabric responsive to the first request.

3. The data processing system of claim 1 wherein the table is stored in a name server in the fabric.

4. The data processing system of claim 1 further comprising:

sending a proposed address to the fabric with a request, and confirming by the fabric that the proposed address has already been assigned to the same partition.

5. The data processing system of claim 1 wherein said server sends an updated address to the fabric with a request, and the fabric updates the stored address associated with the partition on whose behalf the request was sent with said updated address.

6. In a data processing network having a server, multiple partitions in the server, a fabric, and a channel adapter for communicating messages between the partitions and the fabric, an apparatus for assigning addresses to the channel adapter, the apparatus comprising the channel adaper and the fabric, the apparatus configured to perform a method comprising:

sending by said channel adapter, multiple requests to the fabric for address identifications each to be assigned to a respective partition identified by a worldwide unique partition identifier, each request sent on behalf of a respective one of said partitions;

assigning by said fabric, a unique address identification in response to each request, each address identification being associated with the respective partition on whose behalf the request was sent for effecting communication with the respective partition, said assigned address identification being previously unknown to the respective partition;

storing in a table in the fabric, the worldwide unique partition identifiers and their corresponding addresses; and returning by a transmitter in said fabric, the assigned address identification for each request, such that when a message is sent from the fabric to a partition via said channel adapter the sender of the message sees multiple channels adapters corresponding to said multiple partitions and wherein multiple addresses are assigned to the same channel adapter as assigned for said multiple partitions.

7. The apparatus of claim 6 wherein said fabric establishes the table in the fabric responsive to the first request.

8. The apparatus of claim 6 wherein said fabric establishes the table in a name server in the fabric.

9. The apparatus of claim 6 wherein said server sends a proposed address to the fabric with a request, and said fabric confirms that the proposed address has already been assigned to the same partition.

10. The method of claim 6 wherein said fabric sends an updated address to the fabric with a request, and said fabric updates the stored address associated with the partition on whose behalf the request was sent with said updated address.

11. A program product for use with a data processing network having a server, multiple partitions, a fabric, and a channel adapter communicating between the partition and the fabric, said program product comprising:

a non-transistory computer readable medium having recorded thereon computer readable program code for performing a method of assigning address to the channel adapter, the method comprising:

sending multiple requests from the channel adapter to the fabric for address identifications each to be assigned to a respective partition identified by a worldwide unique partition identifier, each request sent on behalf of a respective one of said partitions;

assigning a unique address identification by the fabric in response to each request, each address identification being associated with the respective partition on whose behalf the request was sent for effecting communication with the respective partition, said assigned address identification being previously unknown to the respective partition;

storing in a table in the fabric, the worldwide unique partition identifiers and their corresponding addresses; and returning the assigned address identification for each request, such that when a message is sent from the fabric to a partition via said channel adapter the sender of the message sees multiple channels adapters corresponding to said multiple partitions and wherein multiple addresses are assigned to the same channel adapter as assigned for said multiple partitions.

12. The program product of claim 11 wherein said method further comprises establishing the table in the fabric responsive to the first request.

13. The program product of claim 11 wherein the table is stored in a name server in the fabric.

14. The program product of claim 11 wherein the method further comprises:

sending a proposed address to the fabric with a request, and confirming by the fabric that the proposed address has already been assigned to the same partition.

15. The program product of claim 11 wherein the method further comprises:

sending an updated address to the fabric with a request; and updating by the fabric, the stored address associated with the partition on whose behalf the request was sent with said updated address.

* * * * *